United States Patent
Noumi et al.

(10) Patent No.: US 8,486,343 B2
(45) Date of Patent: Jul. 16, 2013

(54) APPARATUS FOR PRODUCING SILICON

(75) Inventors: Hiroo Noumi, Shunan (JP); Satoru Wakamatsu, Shunan (JP); Nobuaki Yoshimatsu, Shunan (JP)

(73) Assignee: Tokuyama Corporation, Shunan-Shi (JP)

( * ) Notice: Subject to any disclaimer, the term of this patent is extended or adjusted under 35 U.S.C. 154(b) by 155 days.

(21) Appl. No.: 13/055,766

(22) PCT Filed: Jul. 29, 2009

(86) PCT No.: PCT/JP2009/063497
§ 371 (c)(1),
(2), (4) Date: Jan. 25, 2011

(87) PCT Pub. No.: WO2010/016415
PCT Pub. Date: Feb. 11, 2010

(65) Prior Publication Data
US 2011/0123408 A1    May 26, 2011

(30) Foreign Application Priority Data

Aug. 6, 2008 (JP) ................. 2008-203040

(51) Int. Cl.
*B01J 19/00* (2006.01)
*A62D 3/00* (2007.01)

(52) U.S. Cl.
USPC ............ 422/198; 422/199; 118/725; 117/206

(58) Field of Classification Search
USPC .................... 422/198, 199; 118/725; 117/206
See application file for complete search history.

(56) References Cited

U.S. PATENT DOCUMENTS

| | | | |
|---|---|---|---|
| 5,591,415 A * | 1/1997 | Dassel et al. | 422/241 |
| 6,784,079 B2 | 8/2004 | Wakamatsu et al. | |
| 6,861,144 B2 | 3/2005 | Wakamatsu et al. | |
| 7,413,718 B2 | 8/2008 | Nakamura et al. | |
| 2006/0219161 A1 * | 10/2006 | Wakamatsu et al. | 117/200 |
| 2007/0264173 A1 * | 11/2007 | Sakida et al. | 422/198 |

FOREIGN PATENT DOCUMENTS

| | | |
|---|---|---|
| JP | 2002-29726 A | 1/2002 |
| JP | 2003-54933 A | 2/2003 |
| JP | 2007-210847 A | 8/2007 |
| WO | WO 02/100777 A1 | 12/2002 |
| WO | WO 03/106338 A1 | 12/2003 |

OTHER PUBLICATIONS

International Search Report for PCT/JP2009/063497, mailed on Oct. 27, 2009.

* cited by examiner

*Primary Examiner* — Jill Warden
*Assistant Examiner* — Lessanework Seifu
(74) *Attorney, Agent, or Firm* — Birch, Stewart, Kolasch & Birch, LLP

(57) ABSTRACT

A structure for mounting a novel reaction tube is capable of following up the thermal expansion of the reaction tube without the need of hanging down the reaction tube in the apparatus for producing silicon. In a reaction unit in a reaction vessel body of the apparatus for producing silicon, there are provided a gas feed pipe for feeding chlorosilanes and hydrogen, a reaction tube for precipitating silicon, a high-frequency coil arranged on the outer circumferential side of the reaction tube to melt the precipitated silicon, a heat insulating material provided between the reaction tube and the high-frequency coil, and an intermediate wall provided at the lower portion of the reaction unit to support the heat insulating material. The reaction tube is supported on the upper surface of the intermediate wall.

8 Claims, 7 Drawing Sheets

--PRIOR ART--

--PRIOR ART--

APPARATUS FOR PRODUCING SILICON

TECHNICAL FIELD

This invention relates to an apparatus for producing silicon which is capable of stably supporting a reaction tube made of a material having a large coefficient of thermal expansion in a reaction vessel of silicon.

BACKGROUND ART

It has now been urged to efficiently produce polycrystalline silicon of a high purity accompanying the use of polycrystalline silicon in a variety of fields as a starting material of semiconductors and cells for solar generation that are expected to be further developed and demanded in the future.

As a conventional method of producing polycrystalline silicon, there can be exemplified the Siemens' method according to which the surface of a silicon rod arranged, for example, in a bell jar is heated, and a starting gas for precipitating silicon containing chlorosilanes such as trichlorosilane ($SiHCl_3$) or monosilane ($SiH_4$) and a reducing gas such as hydrogen or the like is brought into contact with the surface of the silicon rod to precipitate the polycrystalline silicon.

The Siemens' method has a feature in that it is capable of obtaining silicon of a high purity accompanied, however, by a problem in that since the precipitation is conducted batchwise, a very complex procedure must be conducted such as installing the silicon rod which plays a principal role, heating by flowing an electric current, precipitation, cooling, take out and washing the bell jar.

As a method of efficiently producing silicon and as an apparatus therefor, that may solve the above problem, there have been proposed a method of producing polycrystalline silicon by feeding a starting gas for precipitating silicon into a cylindrical reaction vessel heated at a temperature lower than a melting point of silicon to precipitate silicon, heating the inner surfaces of the cylindrical reaction vessel at a temperature higher than the melting point of silicon, and melting part or whole of the precipitated silicon so that the precipitated silicon falls and is recovered, and an apparatus for producing silicon used for the above method (see patent document 1).

FIG. 6 and FIG. 7 illustrate a conventional apparatus for producing silicon, wherein FIG. 6 is a sectional view of the apparatus for producing silicon and FIG. 7 is a sectional view illustrating, on an enlarged scale, a portion of the reaction unit of the apparatus for producing silicon.

The apparatus 51 for producing silicon includes a reaction unit 52 positioned on the upper side and a recovery unit 53 positioned on the lower side. At the central portion of a ceiling wall of a reaction vessel body 54, a gas feed pipe 55 is provided to feed chlorosilanes and hydrogen which are the starting materials of silicon. A reaction tube 56 is arranged surrounding the outer circumference of the gas feed pipe 55 maintaining a distance. A high-frequency heating coil 61 is wound surrounding the outer circumference of the reaction tube 56 with a heat insulating material 64 interposed therebetween. A partitioning wall 65 is arranged under the reaction tube 56 maintaining a gap. The heat insulating material 64 is made of a carbon graphite having resistance against the heat.

A recovery vessel 58 is placed on a support floor wall 59 of a recovery unit 53 that is positioned at the lower end portion of the reaction vessel body 54. The recovery unit is of a structure that is disassembled to take out the recovery vessel 58. A cooling jacket 60 is arranged in the support floor wall 59. A feed port and a drain port of cooling means that is not shown are connected to the cooling jacket 60, and cooling water is circulated therein. A gas exhaust pipe 63 is arranged between the reaction unit 52 and the recovery unit 53, the gas exhaust pipe 63 being connected to a gas treatment facility on the downstream side.

In the apparatus 51 for producing silicon of the above structure, if a voltage is applied to the high-frequency heating coil 61, the reaction tube 56 is heated by eddy currents due to a high frequency of the high-frequency heating coil 61, and the inner surface of the reaction tube 56 is heated at a temperature in excess of the melting point of silicon. Chlorosilanes and hydrogen are fed from the gas feed pipe 55. These gases come in contact with the inner surface of the reaction tube 56, and silicon is precipitated in a molten state. The silicon solution precipitated in the molten state falls along the lower end portion of the reaction tube 56, i.e., flows down from the opening at the lower end portion of the reaction tube 56 and is recovered in the recovery vessel 58 positioned just underneath.

The silicon recovered in the recovery vessel 58 is cooled by the cooling water in the cooling jacket 60 before the recovery vessel 58 is taken out; i.e., the silicon is taken out of the reaction vessel body 54 together with the recovery vessel 58 in the cooled and solidified state.

PRIOR ART DOCUMENT

Patent Document

Patent document 1: WO02/100777

OUTLINE OF THE INVENTION

Problems that the Invention is to Solve

The reaction tube 56 is made of a graphite having resistance against the heat. The graphite having a length of 7 meters undergoes the thermal expansion of about 100 mm if it is heated at 1000° C. As shown in FIG. 6 and FIG. 7, therefore, the open side at the lower portion of the reaction tube 56 must be in a free state. So far, therefore, the problem of thermal expansion has been solved by hanging the reaction tube 56 in the reaction unit 52.

However, the reaction tube 56 of the hang-down system includes a hanging portion at an upper position. Namely, the center of gravity of the reaction vessel body is located at an upper position and, therefore, the reaction vessel body must be firmly formed requiring cumbersome assembling operation at the time of installation. Besides, if it is attempted to form a large reaction tube, the dead load is exerted on the reaction tube itself imposing a difficulty in fabricating a large apparatus.

Moreover, the lower end of the reaction tube 56 cannot be supported since it undergoes the thermal expansion and, therefore, chlorosilanes and hydrogen gas infiltrate through a gap s between the reaction tube 56 and the partitioning wall 65. Then the gases may flow into low-temperature portions on the outer side of the reaction tube 56. To prevent this, a nitrogen gas is filled as a sealing gas from a sealing gas feed pipe 67.

In view of the above circumstances, it is an object of the present invention to provide an apparatus for producing silicon equipped with a novel reaction tube, which is capable of following up the thermal expansion of the reaction tube without the need of hanging down the reaction tube and, as for the structure for supporting the reaction tube, is capable of supporting the reaction tube maintaining stability and is, further, capable of decreasing the sealing gas.

Means for Solving the Problems

In order to solve the above problems, the apparatus for producing silicon of the present invention comprises a gas feed pipe for feeding chlorosilanes and hydrogen into a reaction chamber in a reaction vessel; a reaction tube made of a material which permits silicon to be precipitated from the chlorosilanes and hydrogen, and undergoes thermal expansion; heating means arranged on the outer circumferential side of the reaction tube and melts the precipitated silicon; and a heat insulating material provided between the reaction tube and the heating means, the molten silicon being allowed to flow from a lower end portion of the reaction tube down to a recovery unit on the lower side; wherein an intermediate wall protruding toward the center side of the reaction vessel is formed between the reaction chamber and the recovery unit, and the reaction tube is supported by the intermediate wall.

In the apparatus for producing silicon, an expansion member that expands and contracts in the up-and-down direction can be air-tightly arranged between an upper end portion of the reaction tube and a ceiling portion of the reaction chamber.

In the apparatus for producing silicon, a support wall is formed on the upper surface of the intermediate wall, and the reaction tube is supported via the support wall.

In the apparatus for producing silicon, the reaction tube comprises an outer cylindrical reaction tube and an inner cylindrical reaction tube arranged inside the inner circumferential surface of the outer cylindrical reaction tube maintaining a distance; a plurality of protruded portions are formed on the inner circumferential surface of the outer cylindrical reaction tube to protrude inwardly of the reaction vessel maintaining a distance in the circumferential direction of the inner circumferential surface thereof; and the outer cylindrical reaction tube is supported by the intermediate wall while the inner cylindrical reaction tube is supported by the outer cylindrical reaction tube by utilizing the protruded portions.

In the apparatus for producing silicon, the lower end portion of the reaction tube includes an annular flat portion formed on the outer circumferential side of the lower end portion of the reaction tube and a circular truncated conical portion of which the diameter decreases in a tapered manner from the inner circumferential side of the flat portion toward the lower side of the reaction tube in the radial direction thereof, and the flat portion is supported by the support wall so that the circular truncated conical portion protrudes inward beyond the support wall.

Effects of the Invention

In the apparatus for producing silicon of the present invention, the intermediate wall protruding toward the center side of the reaction vessel is formed between the reaction chamber and the recovery unit, and the reaction tube is supported by the intermediate wall. Namely, the reaction tube is placed stationary instead of being hanged down; i.e., stability is imparted to the structure that supports the reaction tube. The load exerted on the reaction is now the compressive force instead of the tensile force enabling the structure to become strong and permitting the reaction tube to be formed in a large size. In the apparatus for producing silicon, there is no need of feeding a sealing gas since the expansion member that expands and contracts in the up-and-down direction is air-tightly arranged between the upper end portion of the reaction tube and the ceiling portion of the reaction chamber.

In the apparatus for producing silicon, the structure for supporting the reaction tube has an increased degree of freedom since the support wall is formed on the upper surface of the intermediate wall and the reaction tube is supported by the support wall.

In the apparatus for producing silicon, the reaction tube comprises an outer cylindrical reaction tube and an inner cylindrical reaction tube arranged inside the inner circumferential surface of the outer cylindrical reaction tube maintaining a distance; a plurality of protruded portions are formed on the inner circumferential surface of the outer cylindrical reaction tube to protrude inwardly of the reaction vessel maintaining a distance in the circumferential direction of the inner circumferential surface; and the outer cylindrical reaction tube is supported by the intermediate wall while the inner cylindrical reaction tube is supported by the outer cylindrical reaction tube by utilizing the protruded portions. Thus, the inner cylindrical reaction tube of the double tubular structure, too, is supported in a stationary structure.

In the apparatus for producing silicon, the lower end portion of the reaction tube includes an annular flat portion formed on the outer circumferential side of the lower end portion of the reaction tube and a circular truncated conical portion of which the diameter decreases in a tapered manner from the inner circumferential side of the flat portion toward the lower side of the reaction tube in the radial direction thereof, and the flat portion is supported by the support wall so that the circular truncated conical portion protrudes inward beyond the support wall. Thus, the flat portion is supported by the partitioning wall maintaining stability, and the silicon is allowed to flow down from the lower end of the circular truncated conical portion without coming in contact with the partitioning wall.

MODE FOR CARRYING OUT THE INVENTION

An apparatus for producing silicon according to a first embodiment of the invention will now be described with reference to the drawings.

Figure 1:
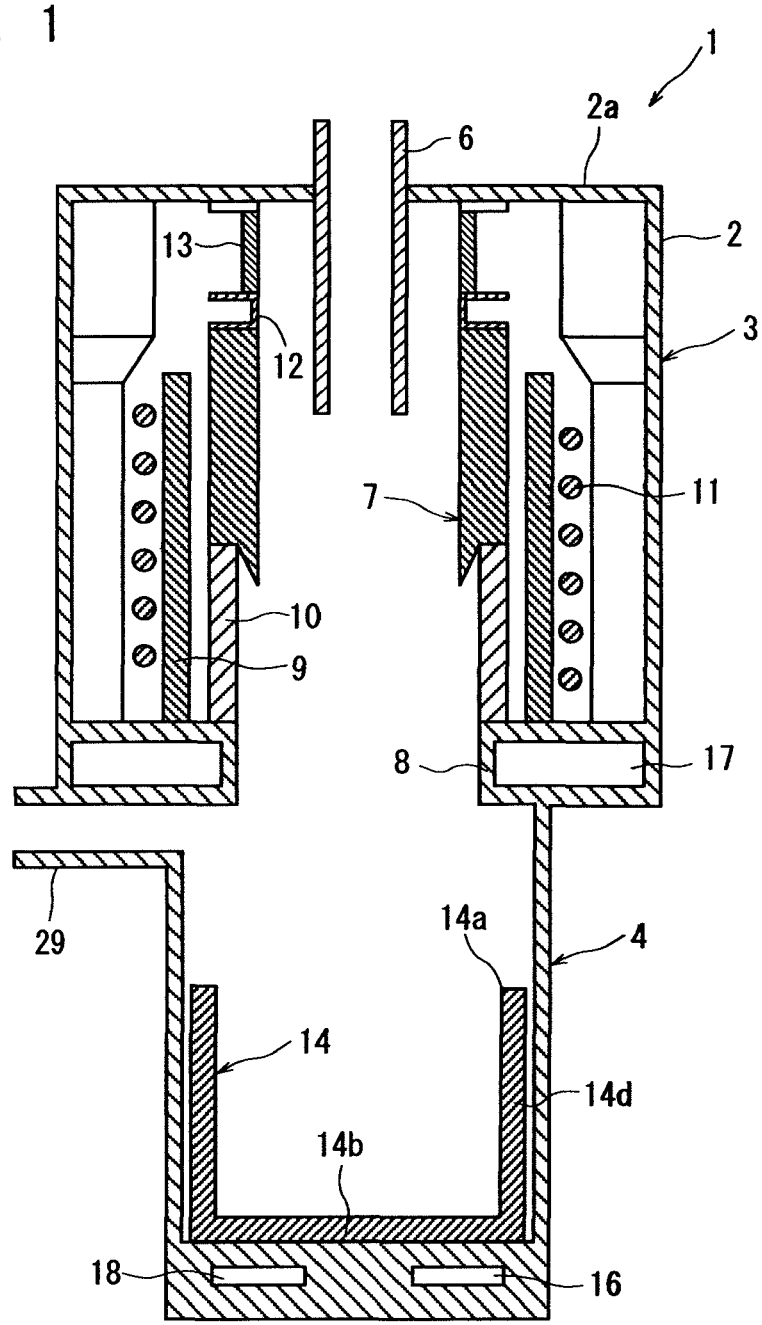
FIG. 1 is a schematic sectional view of an apparatus for producing silicon (single tubular structure) according to a first embodiment of the invention.

FIG. 1 illustrates an apparatus 1 for producing silicon according to the present invention. The apparatus 1 for producing silicon includes a reaction unit 3 that occupies the upper portion of a reaction vessel body 2 having a cylindrical outer wall and a recovery unit 4 that occupies the lower portion thereof. A cylindrical gas feed pipe 6 is provided in the central portion of a ceiling wall 2a of the reaction vessel body 2 to feed chlorosilanes and hydrogen that are the starting materials of silicon. The gas feed pipe 6 is so attached as to penetrate through the ceiling wall 2a with its axis being directed in the up-and-down direction. The gas feed pipe 6 is connected at its upper end side to gas feed means (not shown) that are capable of feeding chlorosilanes and hydrogen, respectively.

An annular intermediate wall 8 is provided between the reaction unit 3 and the recovery unit 4, and a cylindrical support wall 10 is arranged on the upper surface of the intermediate wall 8. The support wall 10 is made of a material having resistance against the heat and, in this embodiment, is made of ceramics. A cylindrical reaction tube 7 is arranged on the upper part of the support wall 10 in a manner that an annular gap is formed between the reaction tube 7 and the gas feed pipe 6.

Figure 2:
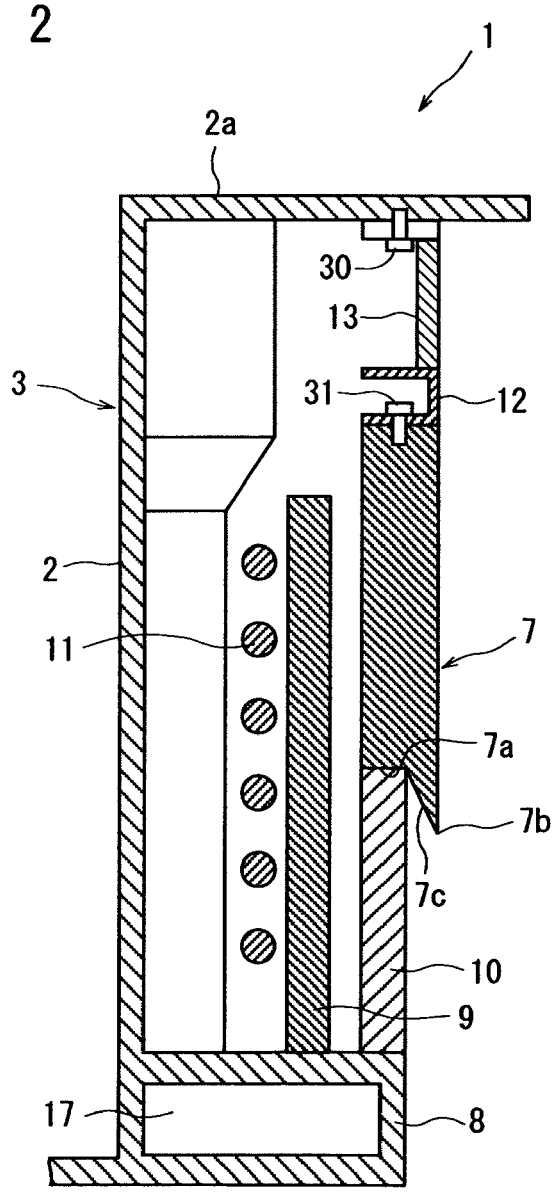
FIG. 2 is a sectional view showing, on an enlarged scale, a portion of a reaction unit in the apparatus for producing silicon of FIG. 1.

Referring to FIG. 2, the reaction tube 7 is arranged being closely contacted to the support wall 10 and in concentric with the gas feed pipe 6. A flat placing portion 7a is formed at the lower end portion of the reaction tube 7 on the outer circumferential side thereof so as to be placed on the support wall 10. The placing portion 7a is supported in a manner of being placed on a flat upper end surface of the support wall 10.

A portion on the inner circumferential side of the placing portion 7a is protruding inward in the radial direction relative to the support wall 10. This portion is so formed that the diameter decreases in a tapered manner from the inner circumferential side of the flat portion at the upper end of the support wall 10 toward the lower side in the radial direction of the reaction tube 7. Namely, an inverse circular truncated conical surface 7c is formed being tilted inward in the radial direction of the reaction tube 7 and downward, and an end portion 7b on the lower end side thereof is protruded toward the recovery unit 4 on the lower side, the end portion 7b being arranged at a position sufficiently lower than the lower end position of the gas feed pipe 6. It is desired that the reaction tube 7 is made of a carbon material such as graphite having resistance at a melting point of silicon. The durability of the reaction tube 7 can be improved if the inner surface thereof that comes in contact with silicon is covered with silicon nitride, silicon carbide or the like. The reaction tube 7 can be formed as a unitary structure requiring, however, a large metal mold. Therefore, the reaction tube 7 may be formed in a divided manner. For instance, the reaction tube 7 may be divided into a plurality of circular sections in the axial direction, which may be stacked, or may be divided into four sections in the circumferential direction for every, for example, 90°. This can be suitably varied depending upon the size and weight of the reaction tube 7. In such cases, a sealing member must be filled in the split lines.

An annular heat insulating material 12 of a U-shape in cross section is arranged on the upper end of the reaction tube 7, the heat insulating material 12 being made of a stainless steel or the like material. A cylindrical expansion member 13 is mounted at its lower end on the upper part of the heat insulating material 12, and the upper end of the expansion member 13 is attached to the ceiling wall 2a. The portion where the expansion member 13 and the ceiling wall 2a are attached together and the portion where the heat insulating material 12 and the upper end of the reaction tube 7 are attached together, are maintained air-tight and are fixed by using bolts 30, 31. As described above, the reaction tube 7 and the support wall 10 are coupled together air-tight, too. Therefore, no gas is allowed to flow between the inner circumferential side of the reaction tube 7 and the outer circumferential side of the reaction tube 7.

The expansion member 13 can be expanded and contracted in the up-and-down direction. Concretely, there can be exemplified a slide structure of two or more cylindrical members having dissimilar diameters and a bellows structure. In addition to the stainless steel, silicon can be used as a material of the expansion member 13.

The reaction vessel body 2 is provided with heating means which according to this embodiment is a high-frequency heating coil 11 wound surrounding the outer circumference of a heat insulating material 9. The high-frequency heating coil 11 is connected to a high-frequency power source that is not shown. The position where the high-frequency heating coil 11 is arranged is from the circumference of the reaction tube 7 down to the circumference of the support wall 10 on the lower side thereof.

The heat insulating material 9 is supported on the upper surface of the intermediate wall 8 maintaining a distance to the outer circumferential surfaces of the reaction tube 7 and the support wall 10. The heat insulating material 9 works to insulate the heat generated by the reaction tube 7 when the high-frequency heating coil 11 is in operation and is made of, for example, a felt-like carbon fiber or a ceramic sintered body but is, in this embodiment, made of the carbon fiber. A cooling jacket 17 is provided in the lower portion of the intermediate wall 8 and is fed with cooling water from a feed pipe that is not shown. The cooling water is drained from a drain pipe.

Referring to FIG. 1, the recovery unit 4 positioned under the reaction vessel body 2 is provided with a recovery vessel 14 of a cylindrical shape having bottom. The recovery vessel 14 is positioned just under the reaction tube 7 and has an opening 14a formed at an upper part thereof which is sufficiently larger than the inner diameter of the reaction tube 7. The recovery vessel 14 is placed on a support floor wall 16 arranged in the horizontal direction on the side of the lower part of the reaction vessel body 2. The material of the recovery vessel 14 is carbon having large resistance against the heat.

A cooling jacket 18 for cooling the recovery vessel 14 is arranged in the lower portion of the support floor wall 16 that is arranged in the bottom portion of the recovery vessel 14. A feed pipe that is not shown is coupled to the cooling jacket 18 to flow cooling water and is, further, coupled to cooling water feed means that is not shown. The cooling water is drained from a drain pipe that is not shown. An exhaust pipe 29 is formed in the lower portion of the intermediate wall 8 of the reaction unit 3 to exhaust the gas therein into an external step of after-treatment.

Next, described below is the operation of the apparatus for producing silicon according to the embodiment.

To operate the apparatus 1 for producing silicon shown in FIG. 1, a voltage is applied to the high-frequency heating coil 11 of the reaction vessel body 2. Then the reaction tube 7 is heated by eddy currents due to a high frequency of the high-frequency heating coil 11, and the inner surface of the reaction tube 7 is heated at a temperature in excess of the melting point of silicon. Chlorsilanes and hydrogen are fed from the gas feed pipe 6 and come in contact with the inner surface of the reaction tube 7 so that silicon is precipitated in a molten state.

As the chlorosilanes to be used for the reaction, there can be exemplified chlorodisilanes such as trichlorosilane ($SiHCl_3$), silicon tetrachloride ($SiCl_4$), dichlorosilane ($SiH_2Cl_2$), monochlorosilane ($SiH_3Cl$) and hexachlorodisilane ($Si_2Cl_6$), and chlorotrisilanes such as octachlorotrisilane ($Si_3Cl_8$) and the like.

The silicon solution that has precipitated in the molten state creeps from the inner surface of the reaction tube 7 to the lower end portion thereof, flows down from the opening at the lower end portion of the reaction tube 7, and is recovered in the recovery vessel 14 positioned just under thereof. Here, the end portion 7b of the reaction tube 7 has been protruded inward of the reaction vessel body 2 in the radial direction so will not to come in contact with the support wall 10. Therefore, the silicon solution is allowed to flow down into the recovery vessel 14 without coming in contact with the support wall 10.

The unreacted chlorosilane gas, chlorine gas, hydrogen gas and the like gases in the reaction vessel body 2 are exhausted through the exhaust pipe 29. The cooling jacket 17 arranged in the intermediate wall 8 prevents the rise of temperature of the reaction unit 3 and, further, prevents the rise of temperature of the recovery unit 4.

While silicon is being formed, the reaction tube 7 is heated at a temperature of not lower than 1000° C. Here, however, since the expansion member 13 that can expand and contract is arranged on the upper part of the reaction tube 7, the expansion of the reaction tube 7 is absorbed by the expansion member 13 as it contracts, and the reaction tube 7 is not broken.

In this embodiment as described above, even if the reaction tube 7 expands, the expansion of the reaction tube 7 is absorbed by the expansion member 13 to maintain sealing performance. Unlike the prior art, therefore, there is no need of forming a space that serves as a gas flow passage between the reaction tube 56 and the partitioning wall 65 (see gap s in FIG. 7). Accordingly, the unreacted chlorosilane gas, chlorine gas, hydrogen gas and the like gases do not flow to the outer circumferential side of the reaction tube 56. Therefore, there is no need of feeding a nitrogen gas from the sealing gas feed pipe 67 (see FIG. 7). So far, therefore, a gas stream has occurred between the interior and the exterior of the reaction tube in the reaction unit due to the structure of the apparatus for producing silicon. In this embodiment, however, no such gas stream occurs in the reaction unit 3. Accordingly, the silicon can be formed maintaining improved quality. Besides, omission of the nitrogen gas feeding facility such as the sealing gas feed pipe 67 makes it possible to simplify the facility of the apparatus for producing silicon.

The silicon recovered in the recovery vessel 14 is cooled by the cooling water in the cooling jacket 18 and is solidified from the molten state before the recovery vessel 14 is taken out. Thereafter, the recovery unit 4 is disassembled in the solidified state, and the recovery vessel 14 is taken out from the recovery unit 4.

After the silicon is recovered and the power source for the high-frequency heating coil 11 is turned off, the temperature of the reaction tube 7 decreases and the length of the reaction tube 7 contracts due to thermal shrinkage. Here, however, the expansion member 13 expands to absorb the contraction of the reaction tube 7.

According to the embodiment of the present invention as described above, the structure is transformed into the one in which the reaction tube is installed on the support wall 10 formed on the intermediate wall 8 from the one in which the reaction tube is hanged down, making it possible to follow up the thermal expansion of the reaction tube 7 as well as to maintain the reaction chamber hermetically sealed. Besides, upon transforming the structure in which the reaction tube is hanged down into the one in which it is installed, the reaction tube 7 itself becomes rigid and its life can be extended.

Figure 7:
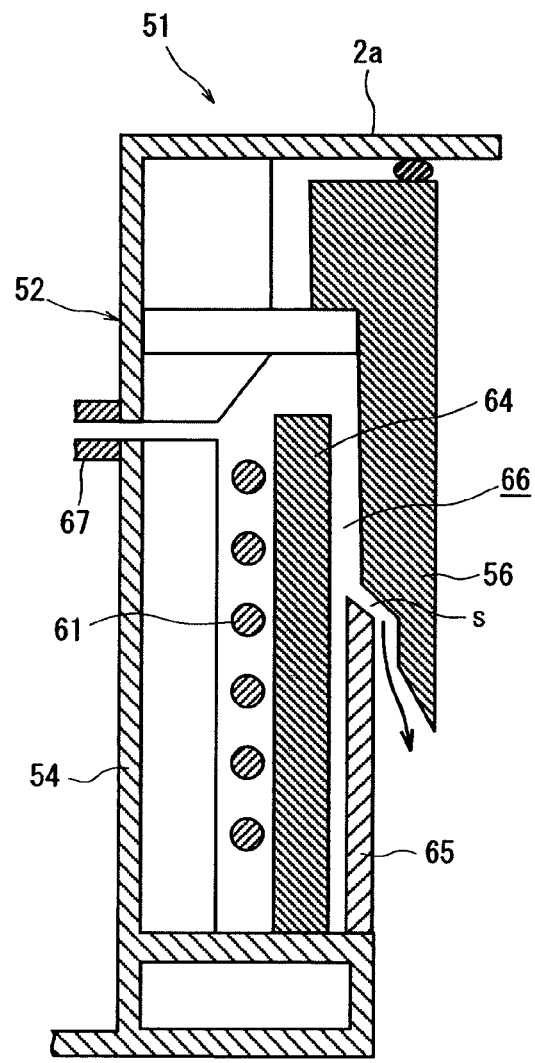
FIG. 7 is a sectional view showing, on an enlarged scale, a portion of a reaction unit in the apparatus for producing silicon of FIG. 6.

In the prior art, if hydrogen infiltrates through the gap between the reaction tube 56 and the partitioning wall 65 while using carbon graphite for a heat insulating material 64 shown in FIG. 7 and if the temperature of hydrogen is high, then the carbon graphite and hydrogen come in contact and the methanization reaction may take place. Therefore, the sealing gas was necessary. The above expansion member 13 is better used. However, the upper portion of the reaction tube is positioned being separated away from the highly heated portion and is less affected even without flowing the sealing gas. Besides, the methanization of hydrogen can be prevented by using hydrogen of a low temperature. In this sense, therefore, the expansion member 13 does not have to be necessarily used (the same also holds true for the expansion members 13, 41 of a second embodiment).

Next, the apparatus for producing silicon according to the second embodiment of the invention will be described with reference to the drawings. In this embodiment, what makes a difference is the constitution of the reaction unit 3 of the reaction vessel body 2 in the apparatus for producing silicon, but the recovery unit 4 has the same structure. Therefore, the constitution of the reaction unit 3 will be described. Further, those portions having basically the same constitutions as those of the above first embodiment are denoted by the same reference numerals.

Figure 3:
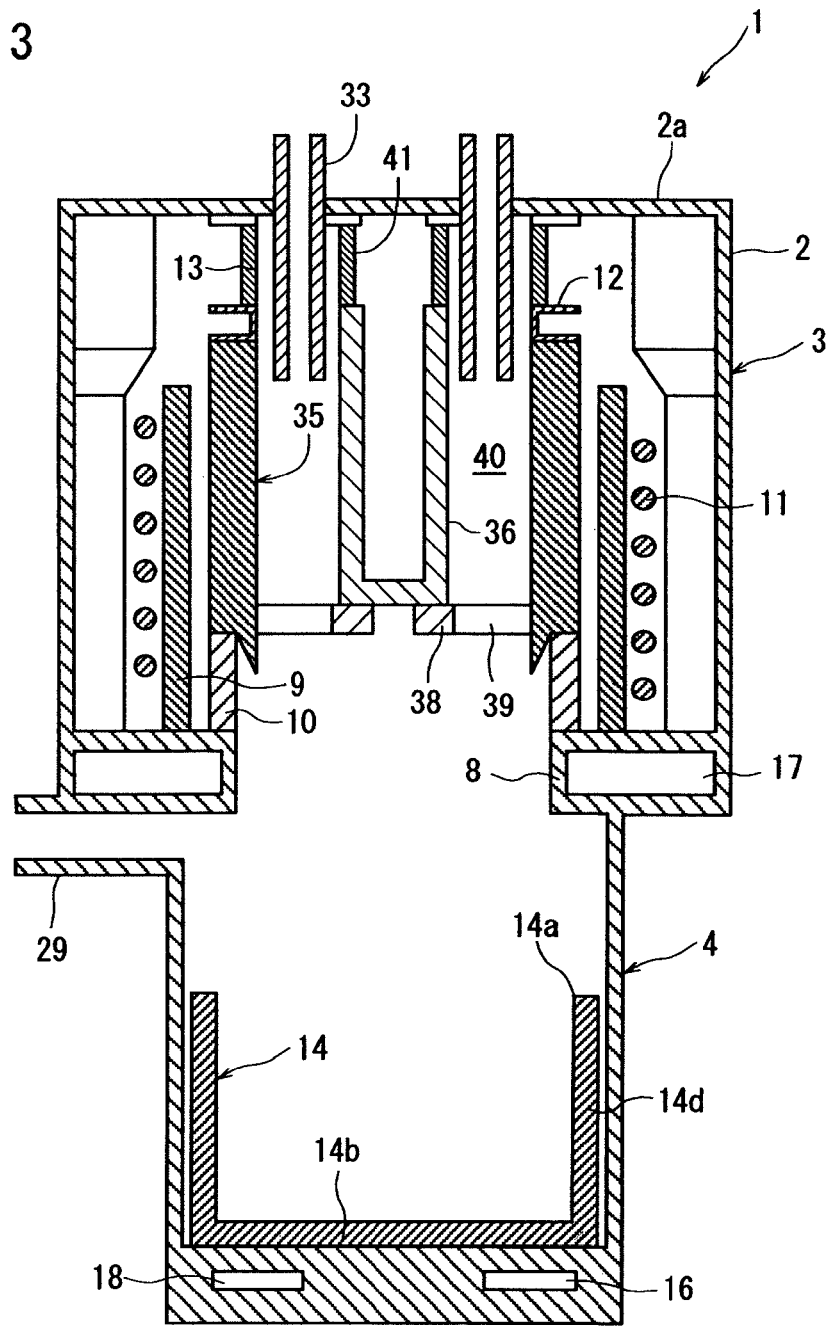
FIG. 3 is a schematic sectional view of the apparatus for producing silicon (double tubular structure) according to a second embodiment of the invention.

FIG. 3 illustrates the apparatus 1 for producing silicon according to the present invention. The apparatus 1 for producing silicon includes the reaction unit 3 that occupies the upper portion of the reaction vessel body 2 having the cylindrical outer wall and the recovery unit 4 that occupies the lower portion thereof. A gas feed pipe 33 of an annular shape is provided in the ceiling wall 2a of the reaction vessel body 2 to feed starting materials of silicon. The gas feed pipe 33 is so attached as to penetrate through the ceiling wall 2a with its axis being directed in the up-and-down direction. The gas feed pipe 33 is connected to gas feed means (not shown) that are capable of feeding chlorosilanes and hydrogen, respectively.

The annular intermediate wall 8 is provided between the reaction unit 3 and the recovery unit 4, and the cylindrical support wall 10 is arranged on the upper surface of the intermediate wall 8. The support wall 10 is made of ceramics having resistance against the heat. A cylindrical outer reaction tube 35 is arranged on the upper part of the support wall 10 being positioned on the outer circumferential side of the gas feed pipe 33.

Figure 4:
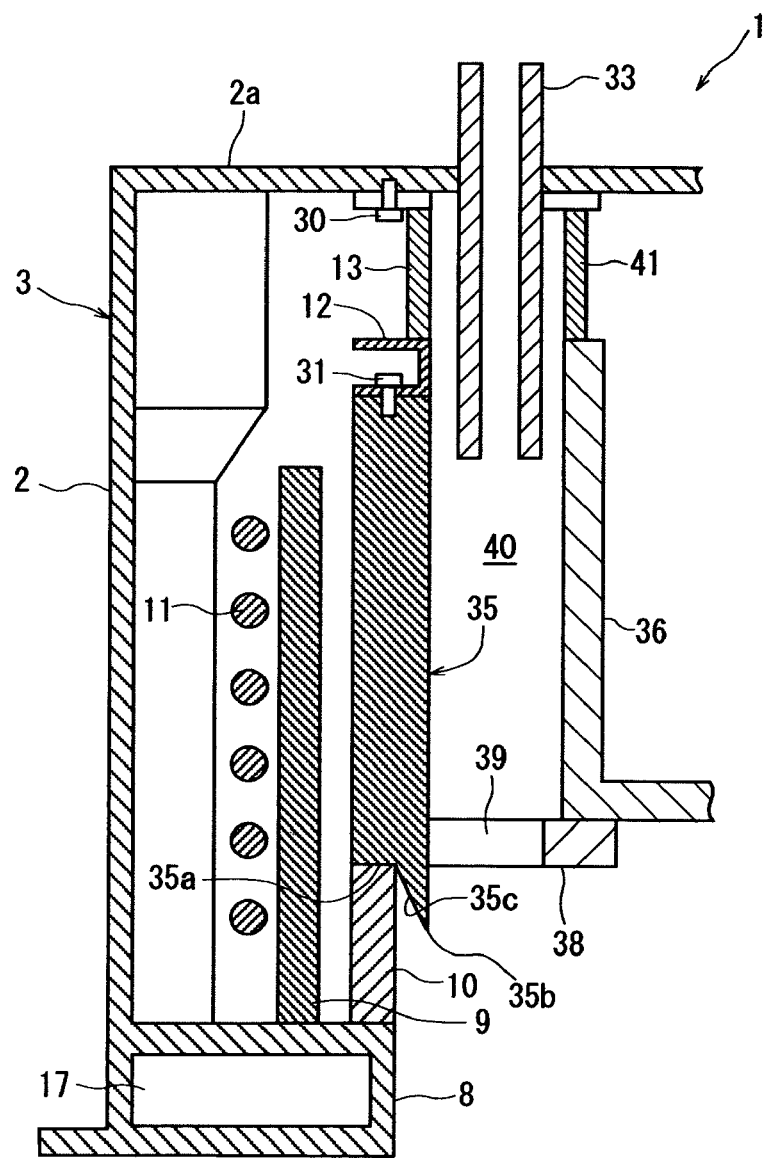
FIG. 4 is a sectional view showing, on an enlarged scale, a portion of the reaction unit in the apparatus for producing silicon of FIG. 3.

Referring to FIG. 4, the outer cylindrical reaction tube 35 is arranged being closely contacted to the support wall 10 and in concentric with the gas feed pipe 33. A flat to-be-placed portion 35a is formed at the lower end portion of the outer cylindrical reaction tube 35 on the outer circumferential side thereof so as to be placed on the support wall 10. The to-be-placed portion 35a is supported in a manner of being placed on the flat upper end surface of the support wall 10.

A portion on the inner circumferential side of the to-be-placed portion 35a is protruding inward in the radial direction relative to the support wall 10. An inverse circular truncated conical surface 35c is formed being tilted downward from the upper end portion of the support wall 10 toward the inside in the radial direction thereof, and an end portion 35b on the lower end side thereof is protruded toward the recovery unit 4 on the lower side. The end portion 35b of the outer cylindrical reaction tube 35 is arranged at a position sufficiently lower than the lower end position of the gas feed pipe 33. It is desired that the outer cylindrical reaction tube 35 is made of a carbon material such as graphite having resistance at a melting point of silicon. The durability of the reaction tube 35 can be improved if the inner surface thereof that comes in contact with silicon is covered with silicon nitride, silicon carbide or the like. The outer cylindrical reaction tube 35 can be divided into a plurality of circular sections in the axial direction and can be stacked, or can be divided into four sections in the circumferential direction for every, for example, 90°. This can be suitably varied depending upon the size and weight of the outer cylindrical reaction tube 35.

The heat insulating material 12 of a U-shape in cross section is arranged on the upper end of the outer cylindrical reaction tube 35, the heat insulating material 12 being made of a stainless steel or the like material. The cylindrical expansion member 13 is mounted at its lower end on the upper part of the heat insulating material 12, and the upper end of the expansion member 13 is attached to the receiving wall 2a. The portion where the expansion member 13 and the ceiling wall 2a are attached together and the portion where the heat insulating material 12 and the upper end of the outer cylindrical reaction tube 35 are attached together, are maintained air-tight and are fixed by using bolts 30, 31. As described above, the outer cylindrical reaction tube 35 and the support wall 10 are coupled together air-tight, too. Therefore, no gas is allowed to flow between the inner circumferential side of the outer cylindrical reaction tube 35 and the outer circumferential side of the outer cylindrical reaction tube 35.

The expansion member 13 can be expanded and contracted in the up-and-down direction, and can be made of a material such as silicon in addition to stainless steel.

Figure 5:
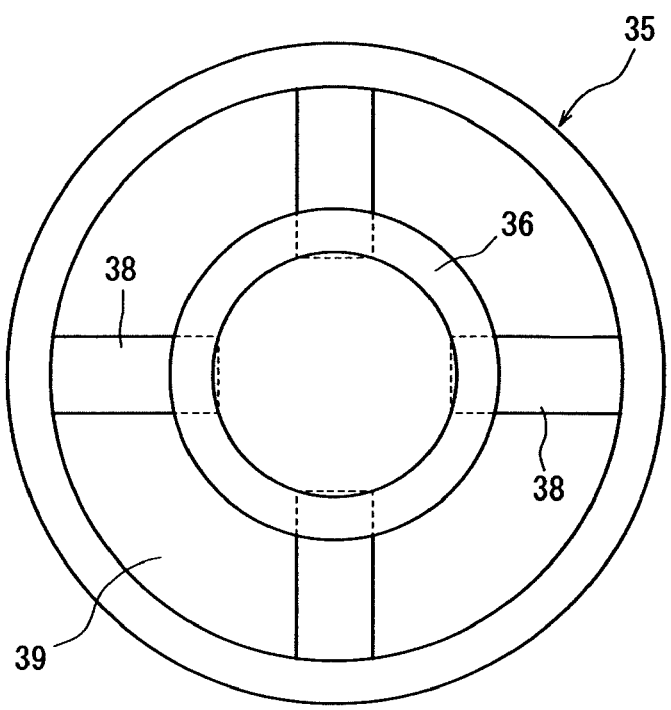
FIG. 5 is a sectional view of when an outer cylindrical reaction tube and an inner cylindrical reaction tube are viewed from the upper side.

Referring to FIG. 3, protruded portions 38 are formed on the inner circumferential surface of the outer cylindrical reaction tube 35 on the lower end side thereof so as to protrude toward the center of the reaction vessel body 2 in the horizontal direction. The plurality of protruded portions 38 (four places) are attached to the outer cylindrical reaction tube 35 integrally therewith and, in this embodiment as shown in FIG. 5, are arranged in the circumferential direction of the outer cylindrical reaction tube 35 maintaining an interval of 90°.

An inner cylindrical reaction tube 36 having bottom is supported being placed on the end portions on the upper surfaces of the protruded portions 38. The distances between the ends of the opposing protruded portions 38 are sufficiently smaller than the outer diameter of the inner cylindrical reaction tube 36 so as to support the inner cylindrical reaction tube 36. Like the outer cylindrical reaction tube 35, the inner cylindrical reaction tube 36 is made of a carbon material such as graphite. Referring to FIG. 5, gaps 39 are formed among the neighboring protruded portions 38. The gaps 39 are communicating the reaction space 40 (FIG. 4) formed between the inner circumferential surface of the outer cylindrical reaction tube 35 and the outer circumferential surface of the inner cylindrical reaction tube 36 with the interior of the chamber in the lower recovery unit 4 (FIGS. 3 and 4).

An expansion member 41 that can expand and contract in the up-and-down direction is mounted at its lower end on the upper end of the inner cylindrical reaction tube 36, and the upper end of the expansion member 41 is attached to the ceiling wall 2a. The portion where the expansion member 41 and the ceiling wall 2a are attached together and the portion where the expansion member 41 and the upper end portion of the inner cylindrical reaction tube 36 are attached together, are maintained air-tight and are fixed by using bolts that are not shown.

Therefore, an annular space is air-tightly formed in the reaction space 40 between the inner circumferential surface of the outer cylindrical reaction tube 35 and the outer circumferential surface of the inner cylindrical reaction tube 36, and no gas flows except the gases from the gas feed pipe 33 into the reaction space 40 from the outer circumferential side of the outer cylindrical reaction tube 35 or from the inner circumferential side of the inner cylindrical reaction tube 36.

In addition to the stainless steel, silicon can be used as a material of the expansion member 41.

The reaction vessel body 2 is provided with heating means which according to this embodiment is the high-frequency heating coil 11 wound surrounding the outer circumference of the heat insulating material 9. The high-frequency heating coil 11 is connected to the high-frequency power source that is not shown. The position where the high-frequency heating coil 11 is arranged is from the circumference of the reaction tube 35 down to the circumference of the support wall 10 on the lower side thereof.

The heat insulating material 9 is supported on the upper surface of the intermediate wall 8 maintaining a distance to the outer circumferential surfaces of the reaction tube 35 and the support wall 10. The heat insulating material 9 works to insulate the heat generated by the reaction tube 35 when the high-frequency heating coil 11 is in operation and is made of, for example, a felt-like carbon fiber or a ceramic sintered body. The cooling jacket 17 is provided in the lower portion of the intermediate wall 8 and is fed with cooling water from the feed pipe that is not shown. The cooling water is drained from the drain pipe.

The recovery unit 4 is constituted in the same manner as that of the first embodiment mentioned above.

Described below is the operation of the apparatus for producing silicon according to the second embodiment.

To operate the apparatus 1 for producing silicon, a voltage is applied to the high-frequency heating coil 11 of the reaction vessel body 2. Then the outer and inner reaction tubes 35 and 36 are heated by eddy currents due to a high frequency of the high-frequency heating coil 11, and the inner surfaces of the reaction tubes 35 and 36 are heated at a temperature in excess of the melting point of silicon. Chlorsilanes and hydrogen are fed from the annular gas feed pipe 33 and come in contact with the inner circumferential surface of the outer cylindrical reaction tube 35 and with the outer circumferential surface of the inner cylindrical reaction tube 36 so that silicon is precipitated in a molten state. By employing the double tubular structure in which the reaction tube comprises the outer cylindrical reaction tube 35 and the inner cylindrical reaction tube 36 as described above, the surface areas for precipitating silicon are broadened, and the productivity of silicon and its production efficiency are improved.

The silicon solution that has precipitated in the molten state creeps from the inner circumferential surface of the outer cylindrical reaction tube 35 and from the outer circumferential surface of the inner cylindrical reaction tube 36 to the lower end portions thereof, flows down from the lower end portions of the reaction tubes 35 and 36, and is recovered in the recovery vessel 14 positioned just under thereof.

While silicon is being formed, the reaction tubes 35 and 36 are heated at a temperature of not lower than 1000° C. and undergo the expansion in the up-and-down direction. Here, however, since the expansion member 13 is arranged on the upper part of the outer cylindrical reaction tube 35 and the expansion member 41 is arranged on the upper part of the inner cylindrical reaction tube 36, the expansions of the reaction tubes 35 and 36 are absorbed by the expansion members 13 and 41 as they contract, and the reaction tubes 35 and 36 are not broken. Further, though only slightly, the expansion members 13 and 41 absorb the expansion of the reaction tubes 35 and 36 in the radial direction preventing them from being damaged.

In this embodiment as described above, even if the outer cylindrical reaction tube 35 expands, the expansion of the outer cylindrical reaction tube 35 is absorbed by the expansion member 13 to maintain sealing performance. Unlike the prior art, therefore, there is no need of forming a space that serves as a gas flow passage between the reaction tube 56 and the partitioning wall 65 (see FIG. 7). Accordingly, the unreacted chlorosilane gas, chlorine gas, hydrogen gas and the like gases do not flow to the outer circumferential side of the reaction tube 5. Therefore, there is no need of feeding a nitrogen gas from the sealing gas feed pipe 67 (see FIG. 7). Similarly, as the inner cylindrical reaction tube 36 expands upward, the expansion member 41 absorbs the expansion of the inner cylindrical reaction tube 36 and the sealing performance is maintained.

So far, a gas stream has occurred between the interior and the exterior of the reaction tube in the reaction unit due to the structure of the apparatus for producing silicon as described above. In this embodiment, however, no such gas stream occurs in the reaction unit 3. Accordingly, the silicon can be formed maintaining improved quality. Besides, omission of the nitrogen gas feeding facility such as the sealing gas feed pipe 67 (see FIG. 7) makes it possible to simplify the facility of the apparatus for producing silicon.

The silicon recovered in the recovery vessel 14 is cooled by the cooling water in the cooling jacket 18 and is solidified from the molten state before the recovery vessel 14 is taken out. Thereafter, the recovery unit 4 is disassembled in the solidified state, and the recovery vessel 14 is taken out from the recovery unit 4.

After the silicon is recovered and the power source for the high-frequency heating coil 11 is turned off, the temperatures of the reaction tubes 35 and 36 decrease. The lengths of the reaction tubes 35 and 36 contract due to thermal shrinkage. Here, however, the expansion members 13 and 41 expand to absorb the contractions of the reaction tubes 35 and 36.

According to the embodiment of the present invention as described above, it is made possible to install both the outer cylindrical reaction tube 35 and the inner cylindrical reaction tube 36 despite the reaction tubes are of the double tubular structure. The reaction tubes 35 and 36 can follow up the thermal expansion and are capable of maintaining the sealing in the reaction unit. Besides, upon transforming the structure from the one in which the outer cylindrical reaction tube 35 is hanged down into the one in which it is installed, the strength can be increased since the load exerted thereon is transformed from the tensile force into the dead load by the compressive force, making it possible to support the inner cylindrical reaction tube 36 in the outer cylindrical reaction tube 35.

Though the embodiments of the invention were described above, it should be noted that the invention can be modified or altered in a variety of other ways without departing from the technical spirit of the invention, as a matter of course.

For instance, the heat insulating material 12 mentioned above is not necessarily essential and may be omitted if the expansion member 13 is made of a material that has a resistance against the heat to a sufficient degree.

Figure 6:
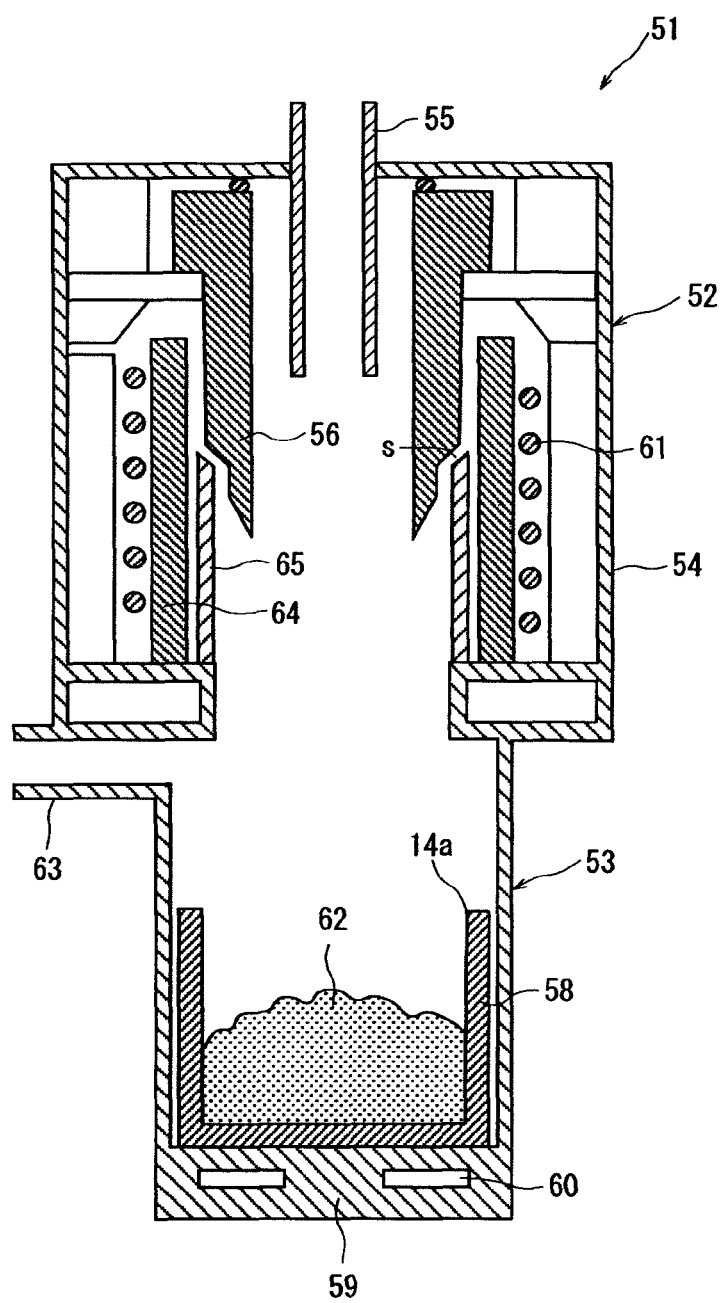
FIG. 6 is a schematic sectional view of a conventional apparatus for producing silicon.

In the above embodiments, further, the reaction tube 7 and the expansion member 13 were maintained air-tight via the heat insulating material 12, and the reaction tube 7 and the support wall 10 were maintained air-tight to interrupt the flow of gas between the interior and the exterior of the reaction tube 7. When they are not maintained air-tight, however, the sealing may be attained by using a nitrogen gas in the same as in the prior art as shown in FIG. 6.

In the above embodiments, further, the support wall 10 was provided on the intermediate wall 8, and the reaction tubes 7 and 35 were supported by the support wall 10. It is, however, also allowable to employ a structure in which the reaction tubes 7 and 35 are directly placed on the intermediate wall 8.

DESCRIPTION OF REFERENCE NUMERALS 1 apparatus for producing silicon
2 reaction vessel body
2a ceiling wall
3 reaction unit
4 recovery unit
6 gas feed pipe
7, 35, 36 reaction tubes
7a placing portion
7b end portion
7c circular truncated conical surface
10 support wall
11 high-frequency heating coil
13, 41 expansion members
14 recovery vessel
17, 18 cooling jackets

The invention claimed is:

1. An apparatus for producing silicon comprising:
a reaction vessel comprising a reaction unit for heating a gas composed of chlorosilanes and hydrogen to precipitate molten silicon out of said gas and to flow down said molten silicon; and
a recovering unit arranged in a lower side of said reaction unit for recovering said molten silicon flowed down from said reaction unit,
wherein said reaction unit comprises:
a reaction tube arranged with an axis being directed in a vertical direction;
a gas feed pipe arranged so as to penetrate through a ceiling wall of said reaction vessel; and
a heater, which is arranged on an outer circumferential side of said reaction tube, for heating said reaction tube,
wherein an intermediate wall protruding toward a center of said reaction vessel is formed between said reaction vessel and said recovery unit, and said reaction tube is mounted on said intermediate wall.

2. The apparatus for producing silicon according to claim 1, wherein an expansion member that expands and contracts in the up-and-down direction is air-tightly arranged between an upper end portion of said reaction tube and a ceiling portion of said reaction chamber.

3. The apparatus for producing silicon according to claim 1, wherein a support wall is formed on the upper surface of said intermediate wall, and said reaction tube is mounted on said intermediate wall via said support wall.

4. The apparatus for producing silicon according to claim 2, wherein a heat insulating material is arranged between a bellows member and said reaction tube.

5. The apparatus for producing silicon according to claim 3, wherein the lower end portion of said reaction tube includes an annular flat portion formed on the outer circumferential side of the lower end portion of said reaction tube and a circular truncated conical portion of which the diameter decreases in a tapered manner from an inner circumferential side of said flat portion toward the lower side of said reaction tube in the radial direction thereof, and said flat portion is supported by said support wall so that said circular truncated conical portion protrudes inward beyond said support wall.

6. The apparatus for producing silicon according to claim 1, wherein said reaction tube is mounted on said intermediate wall so that an inner circumferential surface of said reaction tube is arranged inside of said intermediate wall in the radial direction.

7. The apparatus for producing silicon according to claim 1, wherein the reaction tube has a lower end, and
wherein the intermediate wall is below the reaction tube lower end.

8. The apparatus for producing silicon according to claim 1, wherein the reaction tube has a side wall and a bottom edge, and
wherein a support wall is supported by the reaction vessel and contacts the bottom edge of the reaction tube.

* * * * *